Nov. 5, 1929.  E. H. LEHR  1,734,298
AIR PRESSURE VALVE
Filed Oct. 2, 1925  2 Sheets-Sheet 1

E. H. Lehr INVENTOR
BY Victor J. Evans
ATTORNEY

Nov. 5, 1929.  E. H. LEHR  1,734,298
AIR PRESSURE VALVE
Filed Oct. 2, 1925   2 Sheets-Sheet 2
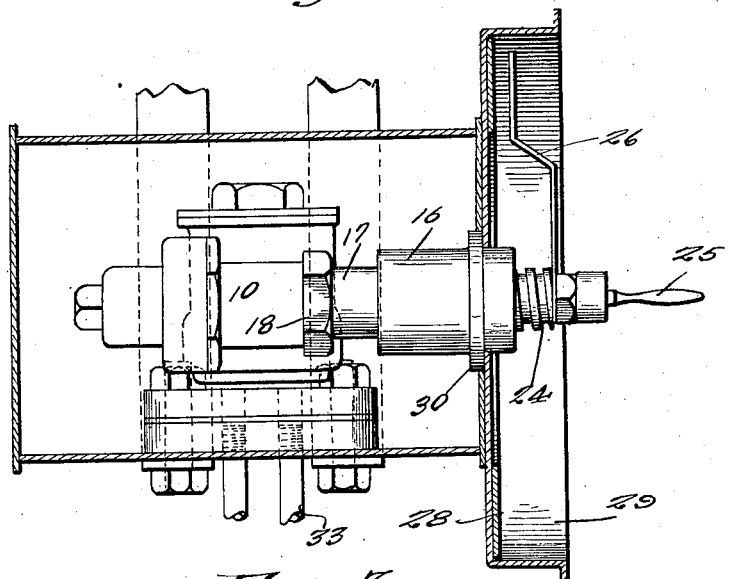
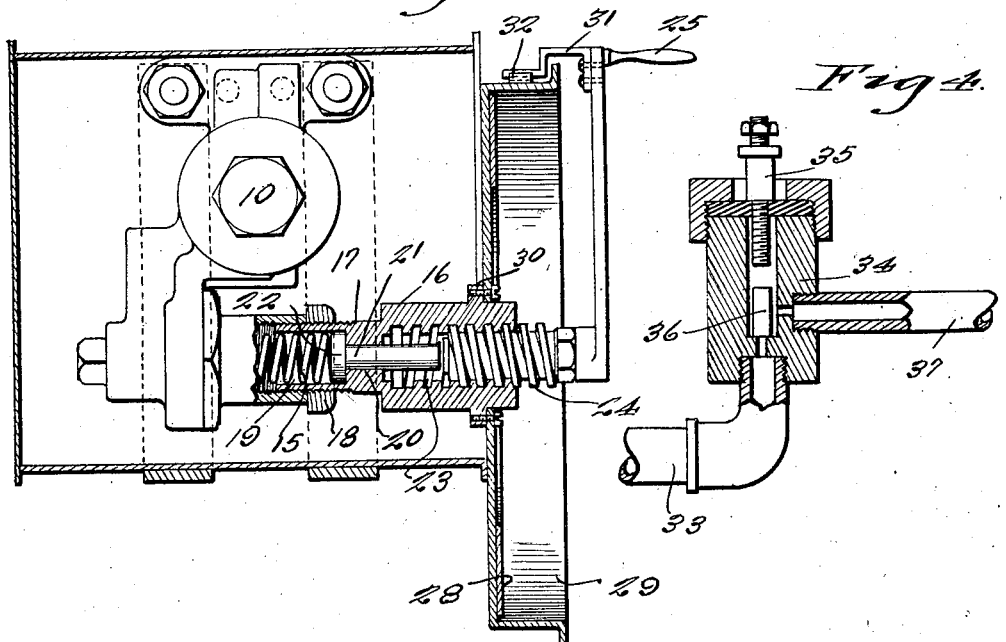
E. H. Lehr INVENTOR
BY Victor J. Evans ATTORNEY
WITNESS:

Patented Nov. 5, 1929

1,734,298

UNITED STATES PATENT OFFICE

EDWARD H. LEHR, OF CONEMAUGH, PENNSYLVANIA

AIR-PRESSURE VALVE

Application filed October 2, 1925. Serial No. 60,133.

This invention relates to improvements in air pressure valves, the general object being the provision of a regulating apparatus to be used in conjunction therewith whereby the exact pressure of air from the pressure valve may be predetermined in the instance of using the air under pressure for filling motor vehicle tires.

Another object of my invention resides in the construction and mounting of a drum and dial upon the regulating means for the air pressure and an indicating hand and operating crank therefor for setting the hand or pointer upon the dial at the desired amount of pounds pressure to be applied to the respective motor vehicle tire and to cooperate with the discharge tube from the regulating apparatus and annunciating system which automatically annunciates that the tire has been filled to the desired number of pounds pressure.

With the above and other objects in view, the invention further includes the following novel features and details of construction, to be hereinafter more fully described, illustrated in the accompanying drawings and pointed out in the appended claim.

In the drawings:—

Figure 2 is a fragmentary side elevation thereof.

Figure 3 is a fragmentary top plan view of my invention.

Figure 4 is a fragmentary elevation of the annunciating apparatus.

Figure 1:
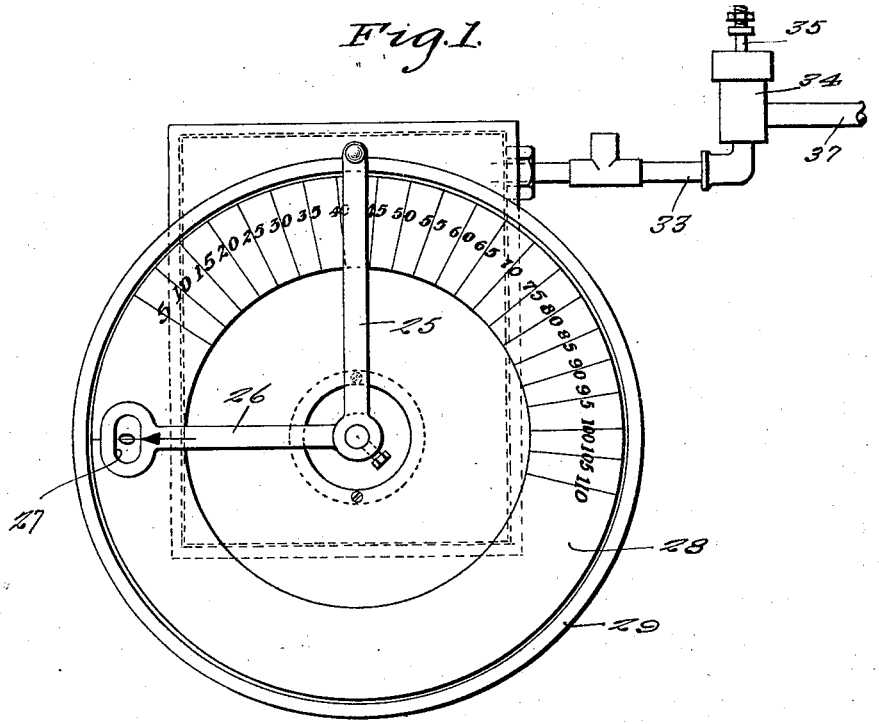
Figure 1 is a front elevation of my invention.
Figure 5:
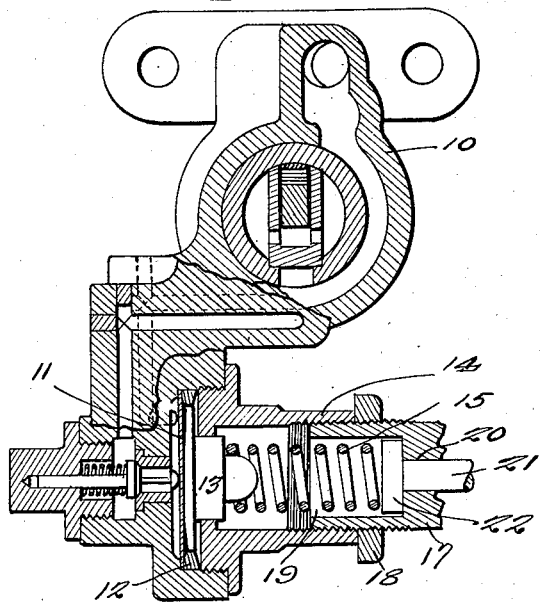
Figure 5 is a sectional view of an air pressure valve illustrating the manner in which my present invention is applied thereto.

Referring to the drawings in detail, wherein like characters of reference denote corresponding parts, the reference character 10 indicates generally an air pressure valve of the usual and well known construction manufactured by Westinghouse and including the usual diaphragm 11, diaphragm ring 12, a diaphragm spindle 13 extending an appreciable distance within a spring box 14 also including a regulating spring 15 therein having its inner end engaging the corresponding end of the diaphragm spindle 13, all of the above being of the usual and well known construction and forming no part of the present application for Letters Patent but being merely shown for purposes of illustration in bringing forward the novel advantages of the above entitled invention when used in conjunction therewith.

The invention residing in the provision of a cylinder 16 having a reduced extension 17 provided upon its inner end and being threaded exteriorly an appropriate portion of its length for engagement within the outer end of the bore of the spring box 14 and held against accidental rotation when so threaded therein through the instrumentality of a jam nut 18 and further including an enlarged socketed portion 19 upon its corresponding end for receiving the adjacent end of the regulating spring 15 therein while a restricted bore 20 communicating the cylinder 16 with the enlarged bore 19 providing a bearing portion or a plunger rod 21 including a plunger 22 upon its inner end and mounted for longitudinal movement within the enlarged bore 19 of the reduced extension 17 while the opposite end of the plunger 21 extends an appreciable distance within the bore of the cylinder 16. The bore of the cylinder 16 being spiraled as indicated at 23 for the reception and spiral longitudinal movement of a spiral shaft 24 therein abutting the adjacent ends of the plunger rod 21, a crank arm 25 is secured to its outer end including a pointer or hand 26 extending at right angles thereto and providing a transversely disposed elongated slot 27 within its outer free end for selective registration and exposing the calibrations provided upon a dial 28 arranged within the enclosure formed by a drum 29 and receiving the forward end portion of the cylinder 16 centrally thereof and secured to an annular flange 30 provided upon the outer surface thereof. An angle arm 31 being secured to the inner side adjacent the outer free end of the crank arm 25 and extending over and in slight spaced relation with respect to the outer surface of the drum 29 for normal engagement with a lug 32 provided at an appropriate point in the circumference of the drum 29 in bringing the pointer or hand 26 into the position as clearly illustrated in Figure 1 of the drawings whereby no air pressure will be emitted from a discharge pipe 33 extending therefrom.

In order to provide an annunciating system for use in conjunction with the present entitled invention and to be connected with the discharge pipe 33, I provide a cylinder 34 having an insulated lug 35 provided upon its top and extending into the bore thereof and adapted to complete a ground circuit for the operation of an electrically operated annunciating system, not shown, when having a contacting engagement with a plug 36, preferably formed of some conducting material such as metal, said plug being mounted for reciprocatory movement within the bore of the cylinder 34, that is, when air pressure is discharged through the discharge pipe 33 and from a pipe 37 leading from the cylinder 34 and when so reciprocated will engage the lower end of the insulated lug 35 and ground the latter with the cylinder 34 whereby the ground circuit is completed. It is of course obvious that after the amount of pounds pressure have been discharged in the manner set forth, that the plug 36 will then fall down into the bottom of the cylinder 34 and the ground circuit will be broken whereby the electrically operated annunciating system will be shut off and the desired signal given to the operator or user, he being well informed that the amount of pounds pressure of air having been discharged from the apparatus as described and illustrated.

The invention is susceptible of various changes in its form, proportions and minor details of construction, and the right is herein reserved to make such changes as properly fall within the scope of the appended claim.

Having described my invention what is claimed is:—

An attachment for use upon air pressure valves comprising a cylinder having a reduced extension adapted for engagement with the spring box therefor, said extension having an enlarged bore adapted to accommodate the adjacent end of the spring for the box, said cylinder being provided with a restricted longitudinally disposed bore between the body of the cylinder and the socketed portion of the extension, a plunger rod slidably mounted within the bore and having a plunger head upon one end disposed within the socketed portion of the extension and engaging the end of the spring therein, a spiraled shaft operable within the cylinder and engageable with the adjacent end of the plunger rod, a crank arm for the shaft, and a drum carried by the cylinder and adapted to indicate the amount of pressure being released from the valve by said shaft.

In testimony whereof I affix my signature.

EDWARD H. LEHR.